United States Patent [19]
Gier

[11] Patent Number: 6,029,861
[45] Date of Patent: Feb. 29, 2000

[54] QUICK MEASURING DEVICE

[76] Inventor: Glen R. Gier, 3571 N. 1700 East, Buhl, Id. 83316

[21] Appl. No.: 09/030,575

[22] Filed: Feb. 24, 1998

[51] Int. Cl.[7] ....................................................... G01F 11/26
[52] U.S. Cl. .......................... 222/333; 222/437; 222/438; 222/440; 222/456; 222/457
[58] Field of Search ..................... 222/454, 456, 222/457, 434, 437, 438, 440, 333, 547, 564, 175, 353

[56] References Cited

U.S. PATENT DOCUMENTS

| | | | |
|---|---|---|---|
| 2,385,195 | 9/1945 | Clower | 222/456 |
| 2,393,262 | 1/1946 | Percy | 222/455 |
| 2,422,263 | 6/1947 | Schara | 222/126 |
| 2,609,967 | 9/1952 | Persons | 222/456 X |
| 2,676,734 | 4/1954 | Mertens | 222/455 |
| 2,896,826 | 7/1959 | Matter | 222/455 |
| 3,333,745 | 8/1967 | Hartley et al. | 222/456 |
| 4,257,534 | 3/1981 | Williams | 222/1 |
| 4,318,500 | 3/1982 | Melikian | 222/425 |
| 4,461,400 | 7/1984 | Kempf et al. | 222/457 X |
| 4,613,064 | 9/1986 | Meyer et al. | 222/456 |
| 4,667,857 | 5/1987 | Song | 222/454 |
| 5,123,575 | 6/1992 | Li | 222/564 |
| 5,469,992 | 11/1995 | Jenkins | 222/362 |
| 5,495,964 | 3/1996 | Santagliuliana | 222/455 |

FOREIGN PATENT DOCUMENTS

| | | | |
|---|---|---|---|
| 5-117706A | 5/1993 | Japan | 222/457 |
| 2113182A | 8/1983 | United Kingdom | 222/456 |

*Primary Examiner*—Kevin R. Shaver
*Assistant Examiner*—Thach Bui
*Attorney, Agent, or Firm*—Robert L. Shaver; Frank J. Dykas

[57] ABSTRACT

A device for measuring and dispensing quantities of free flowing material. The device is a tube with one or more partial walls mounted in the tube. When held at an angle above the angle of repose for the free flowing material and rotated 180° around the longitudinal axis of the tube and then another 180° in either direction, free flowing material is measured and dispensed. The device can measure and dispense a variable amount of material by changing the volume of a variable volume chamber. The device can also be automated to turn by an electric motor or a mechanical device operated by a hand squeezed trigger. The device can be a hand-held tube for dispensing free flowing materials, or it can mount on the top of a container of free flowing materials, and be used to dispense quantities of the free flowing material on demand.

12 Claims, 7 Drawing Sheets

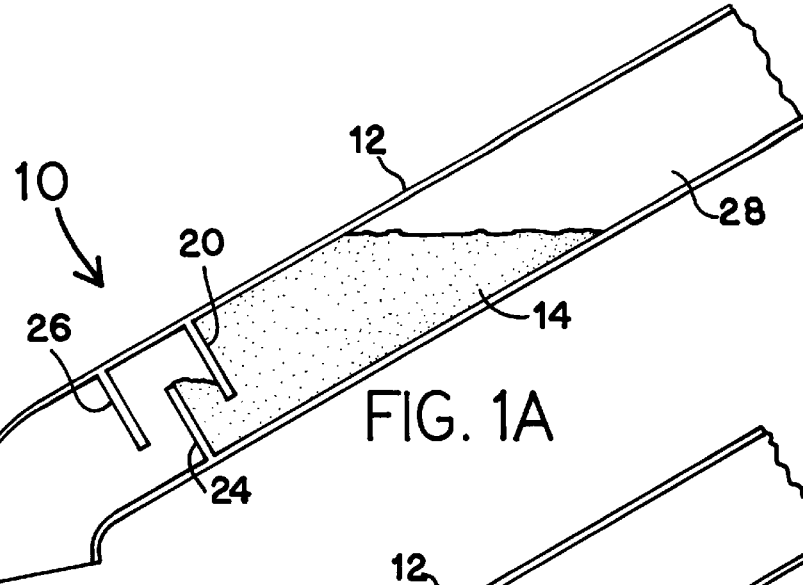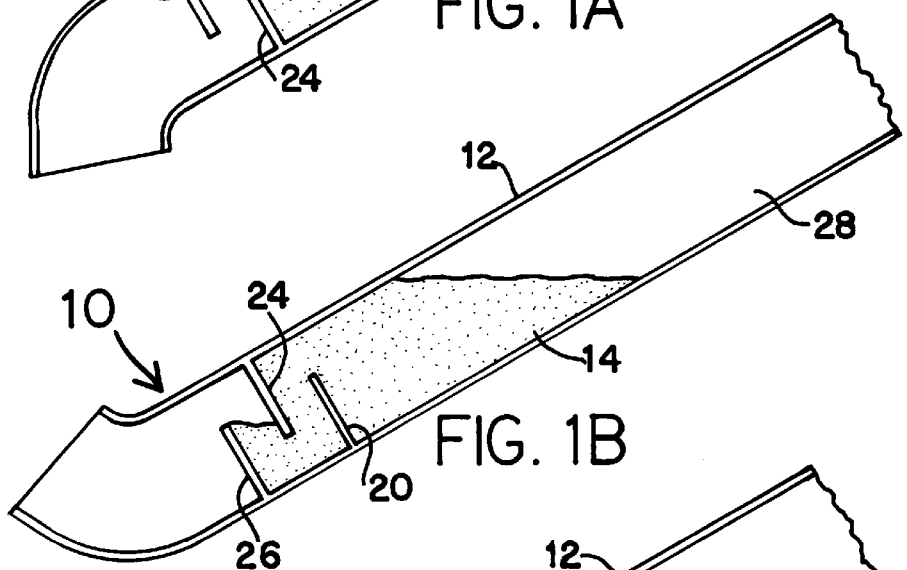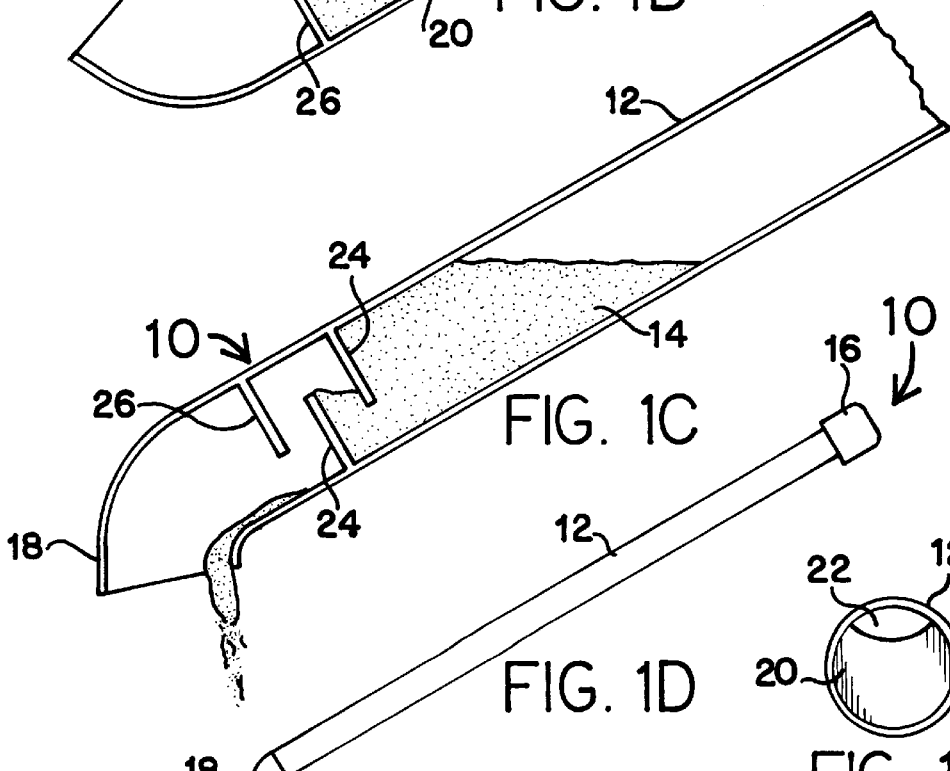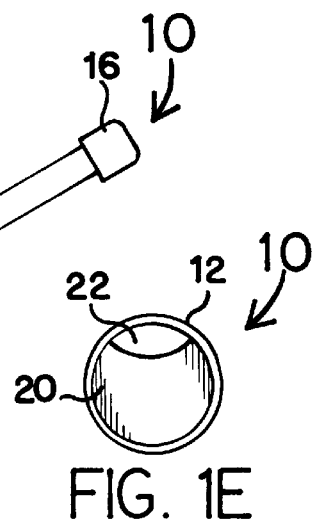

QUICK MEASURING DEVICE

BACKGROUND OF THE INVENTION

1. Field of the Invention

The present invention generally relates to measuring devices, and more particularly to devices which measure quantities of free-flowing material, and dispense discreet volumes of this material.

2. Background Information

There are innumerable free-flowing granular solids which are utilized in the home and in industry for a variety of purposes. These free-flowing solids can include powdered or granular chemicals, fertilizers, pesticides, rice and other grain foods, nutritional additives, foods such as salt, sugar, pepper, spices, and compounds such as cement, gravel, sand and dirt. All of these free-flowing solids are measured in a variety of ways, from measuring spoons for salt and sugar, to scoops, shovels, wheelbarrows, pinches and handfuls.

There are a number of devices which allow for measuring and dispensing discreet quantities of these free-flowing solids. Typical of such devices are specially constructed soap containers. These containers are rectangular boxes with dividing chambers in one end of a box. The dividing chambers form a measuring chamber and a dispensing channel which opens to the outside of the box. The box is inverted, and dry material flows into the measuring chamber. When the box is set upright again, a quantity of soap or other material is left residing in the measuring chamber. When the box is inverted the second time, the material in the measuring chamber flows out the dispensing channel and out the box. At the same time, a new quantity of material refills the measuring chamber. A number of such configurations exist, and their use is well known. There are many variations on this idea, most involving rectangular chambers, and all of them involving inverting the container, setting it upright, and then inverting it a second time for dispensing materials. This configuration of device is particularly well suited to a material such as a powdered laundry product, which is convenient to store in a rectangular box. However, many other dry materials are not conveniently stored in a rectangular box, and if they were placed in a box, inverting the box full of material and setting it upright again would be inconvenient. For instance, fertilizers and pesticides typically come in a paper sack or bag. The bag is cut open and the material poured into a dispenser, such as a fertilizer spreader, or merely sprinkled from the sack to the place of application on the ground. It would be inconvenient to pour the fertilizer or pesticide into a large rectangular box and then to carry the box around a yard or garden, inverting it and setting it upright at every place where fertilizer or pesticide was to be applied. A more convenient method of application would be preferred. Other dry free-flowing materials generally come in a cylindrical container, such as spices, salt and pepper. A measuring and dispensing device which fits on these cylindrical containers would be preferable than having to pour these materials into a rectangular container for dispensing.

There are also many liquids which need to be measured and dispensed conveniently. These include liquid bleach, chlorine solution for use in pools and spas, foods such as soy sauce and vinegar, liquid fertilizer, liquid feed supplement, liquid solutions in manufacturing, and many others.

Accordingly, it is an object of the invention to provide a measuring and dispensing device which is mountable in a cylindrical or tubular section and which does not require inversion of this tubular section.

It is a further object of this invention to provide such a tubular measuring and dispensing device which mounts on existing containers, such as cylindrical containers with threads for snap on lids.

It is a further object of the invention to provide a dispensing and measuring device in which the volume being dispensed can be adjusted and thus provides a variable dispensed volume.

Another object of the invention is to provide a measuring device which measures and dispenses free-flowing material by rotation of the tubular measuring device.

It is a further object of the invention to provide a tubular measuring device which measures and dispenses material by the rotation of the tube in one direction only, as well as by rotation 180°, then counter rotation 180° back in the reverse direction.

It is a further object to provide a measuring and dispensing device which operates with dry free flowing material as well as with liquids.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

According to the present invention, the foregoing and other objects and advantages are obtained by a device for measuring and dispensing quantities of free-flowing material from a tubular device which measures and dispenses by rotation. The free flowing material can be a powdered or granulated solid, or it can be a liquid. The device is filled with any free flowing material at its upstream end, and the free flowing material flows towards its downstream end to a dispensing end. The device includes a tubular channel through which the free flowing material travels by gravity when the tubular channel is inclined at an angle above the angle of repose, for solids, or when air is admitted for liquids. The device for measuring and dispensing the free flowing material also includes one or more wall-like partitions, or septums, mounted in the tubular channel so that each septum is normal or perpendicular to the flow of free flowing material through the tubular channel. Each septum forms an opening against the inside wall of the tubular channel which partially blocks the flow of free flowing material, but which allows a portion of the material to flow past the opening in each septum when the tubular channel is rotated along its longitudinal axis. The second septum is mounted adjacent to the first septum and downstream from the flow of free flowing material, and so that its opening is at an angle around the longitudinal axis of the tubular channel from the opening of the first septum. The third septum is downstream from the second septum and mounted in the tubular channel normal to the flow of free flowing material. The opening of the third septum is also at an angle from the opening of the second septum.

This device can be designed to dispense variable quantities of free flowing material by the use of a chamber which has a variable volume. The device can be made so that the tubular chamber through which the free flowing material flows is also a storage chamber for the free flowing material. The openings defined by the three or more septums can be oriented 180° from the opening formed by an adjacent septum, or these openings can be oriented at different angles from adjacent openings. The free flowing material can be dispensed by rotating the tubular channel 180° in one direction, and then reversing direction and rotating it 180° in the opposite direction. The device can also measure and dispense free flowing material by rotating the tubular channel 360° in one direction. From that point, the tubular channel can be rotated 360° in the same direction to dispense another charge of material, or it can be rotated 360° in the reverse direction to dispense a charge of material.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawing and description are to be regarded as illustrative in nature, and not as restrictive.

BRIEF DESCRIPTION OF THE DRAWINGS

FIG. 1A shows the measuring and dispensing device in cross section.

FIG. 1B shows the measuring and dispensing device in cross section, rotated 180° from FIG. 1A.

FIG. 1C shows the measuring and dispensing device rotated 180° from FIG. 1B, or 360° from FIG. 1A.

FIG. 1D is a side view of the measuring and dispensing device.

FIG. 1E is an end cross-sectional view of the measuring and dispensing device.

DESCRIPTION OF THE PREFERRED EMBODIMENTS

Figure 2:
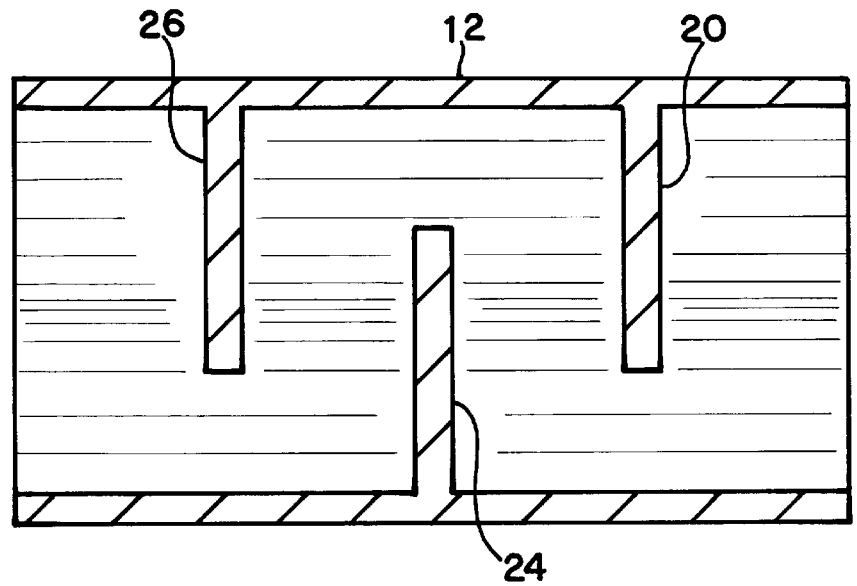
FIG. 2 is a cross-sectional side view of the measuring and dispensing device.

The preferred embodiments of the invention is shown in the figures. FIGS. 1A through 1E show the first preferred embodiment 10 of the measuring and dispensing device. This embodiment of the invention includes a tubular channel 12 in which a free flowing material 14 is placed. Although shown as circular in cross section, other cross sectional shapes of essentially tubular structures would also work, such as square, triangular, oval, pentagonal, etc. At one end of the tubular channel 12 is located an end cap 16 and at the opposite end is located a dispensing nozzle 18. Located inside the tubular channel 12 is a series of partial walls or septums in a holdup region 76. A first septum 20 is adjacent to the free flowing material 14 in the tubular channel 12. The first septum 20 is shown in cross-sectional end view in FIG. 1E, which shows the first septum 20 partially blocking the tubular channel 12, except for a partial opening 22 defined between the first septum 20 and the tubular channel 12. A second septum 24 is located adjacent to the first septum 20, and downstream from it. It is shaped essentially the same as first septum 20 and also defines a partial opening 22. The partial opening 22 of the second septum 24 is at an angle of 180° from that of the first septum 20. Adjacent to the second septum 24 is a third septum 26, which also defines a partial opening between itself and the wall of the tubular channel 12. Its opening 22 is likewise 180° away from that of the second septum 24.

In this embodiment, all of the materials are preferably made of PVC or other plastic materials. Other materials which are moldable and light in weight for the free-flowing material being measured, would also work. For some materials, such as gravel, dirt, or sand, steel or another metal would be preferred.

In the preferred embodiment, the end cap 16 would be removed and a free-flowing material 14 would be added to the tubular channel 12, until the storage chamber 28 was full. During the filling process, the tubular channel 12 would be held at an angle, as shown in FIGS. 1A through 1D. As the storage chamber 28 of the tubular channel 12 fills, the free-flowing material 14 flows through the partial opening 22 of the first septum 20, as shown in FIG. 1A. the free-flowing material 14 builds up on the second septum 24, and does not flow beyond this barrier. When full, the measuring and dispensing device 10 is completed by replacing the end cap 16 on the tubular channel, now full of free-flowing material 14. To measure and dispense discreet quantities of free-flowing material 14, the measuring and dispensing device 10 is rotated 180°, as shown in FIG. 1B. In this position, material which was backed up behind the second septum 24 falls down and is held up by the third septum 26. From this position, the measuring and dispensing device 10 is rotated another 180°, either back in the direction from which it started, or continuing on to complete a 360° revolution. As the measuring and dispensing device 10 returns to the original position shown in FIG. 1A, that portion of the free-flowing material which was held up by the third septum 26, is released and is dispensed through the dispensing nozzle 18. From this position, more discreet quantities of free-flowing material 14 can be dispensed by holding the measuring and dispensing device 10 at roughly a 30° angle, (depending on the angle of repose of the material) rotating the tubular channel 12 180°, and then rotating it back to its starting position. This action is very convenient for use, since it lends itself to the natural motion of the wrist of the user, and the mass of the free-flowing material 14 is very close to the longitudinal axis of the measuring and dispensing device, around which the rotation occurs.

Liquid can be dispensed using this embodiment if the portion of the device 10 which is upstream from the dispensing nozzle is made airtight.

A specific example of the measuring and dispensing device in use is when it is used in agriculture to add polyacrylamide (PAM) to rows under irrigation. PAM is a chemical which has been found to significantly decrease particulates in runoff water from irrigation. A version of the invention which is one inch in diameter and from 36" to 46" long is filled with PAM. The irrigator uses the measuring and dispensing device to deposit about one teaspoonful of PAM in each row being irrigated, at the head of the row where water enters. The water flows downhill and carries with it PAM in solution from the original addition. When the irrigation water exits the row after traveling the length of the row, it has much fewer particulates than a neighboring row to which PAM was not added. Besides having the advantage of quickly measuring and dispensing this chemical, this use of the invention has the advantages of reducing the user's contact with chemicals, reducing his inhalation of fumes and dust, decreasing the handling required in using the chemical, and eliminates the need for wearing rubber gloves or a breathing apparatus when dispensing the chemical in the field.

The configuration of the septa of this preferred embodiment is shown in FIG. 2.

Figure 3:
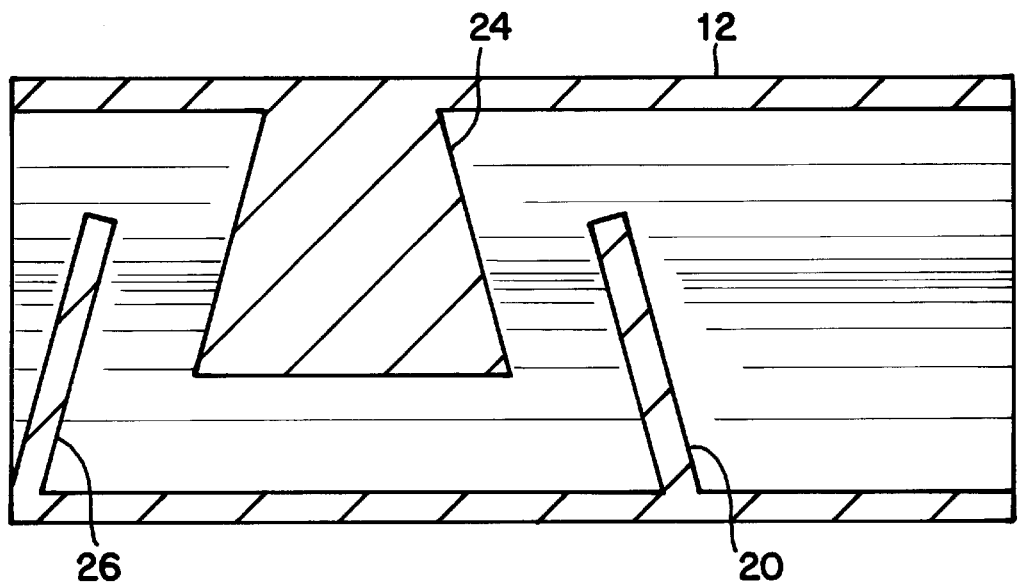
FIG. 3 is a cross-sectional side view of an alternative design of the measuring and dispensing device.
Figure 4:
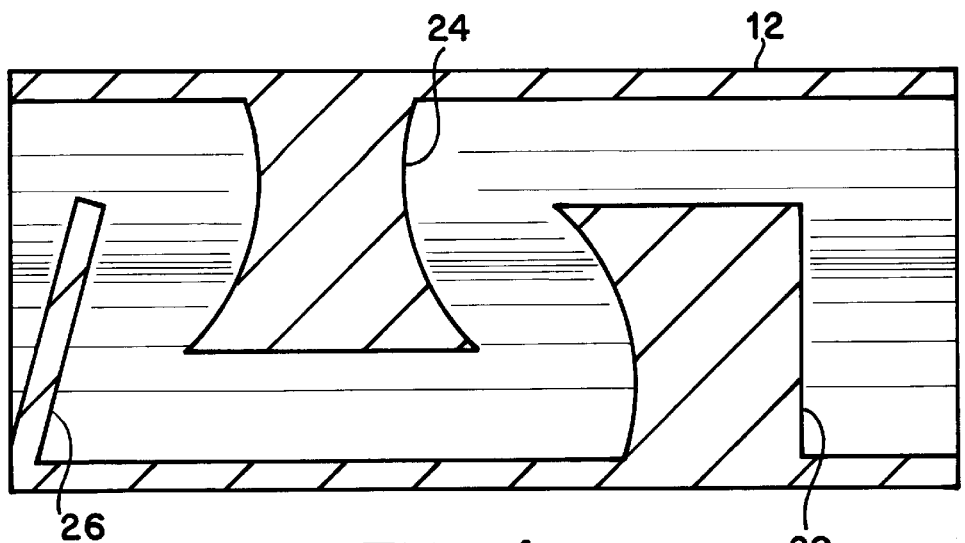
FIG. 4 is a cross-sectional side view of an alternative embodiment of the measuring and dispensing device.

Other configurations are possible, such as those in FIGS. 3 and 4. In these configurations, the principle of operation is the same, and the obstructions to the flow of free-flowing material perform in the same manner. The design shown in FIG. 3 would be useful when a free-flowing material 14 is used which tends to flow very freely, or has a low angle of repose. The configuration of the first septum 20, second septum 24, and third septum 26, act together to keep a more free-flowing material from simply flowing around the impeding structures of the septa. Similarly, the septa of FIG. 4 also acts to slow the flow of a more free-flowing material.

Figure 5:
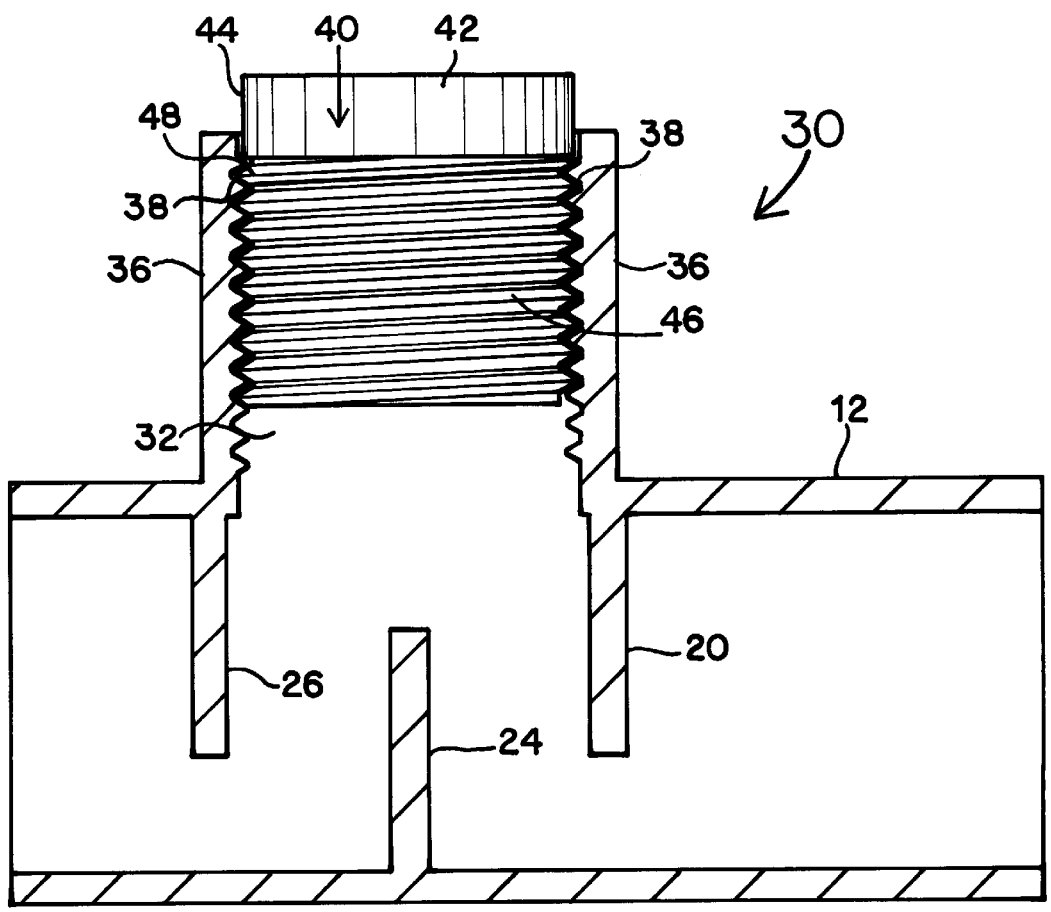
FIG. 5 is a cross-sectional side view of an adjustable volume measuring and dispensing device.

A second preferred embodiment is shown in FIG. 5 as 30. In this embodiment of the measuring and dispensing device, a first septum 20, a second septum 24 and a third septum 26 are still utilized to impede the flow of free-flowing material in a tubular channel 12. Between the first septum 20 and the third septum 26 is located an adjustable chamber 32 whose volume can be adjusted by the position of a threaded plug 42. The adjustable chamber 32 has side walls 36 into which are inscribed threads 38, and also includes an orifice 40. Into the orifice 40 is inserted a threaded plug 42. The threaded plug 42 includes a gripping ring 44 and a cylindrical barrel 46, which is inscribed with threads 48.

The measuring and dispensing device of the second preferred embodiment 30 works in the same manner as that of the first embodiment, except that the volume of material which is dispensed can be adjusted by screwing the threaded plug 42 in or out of the adjustable chamber 32. In this way, the user can change the volume of material which is measured and dispensed for the particular application and free-flowing material he is working with.

Figure 6:
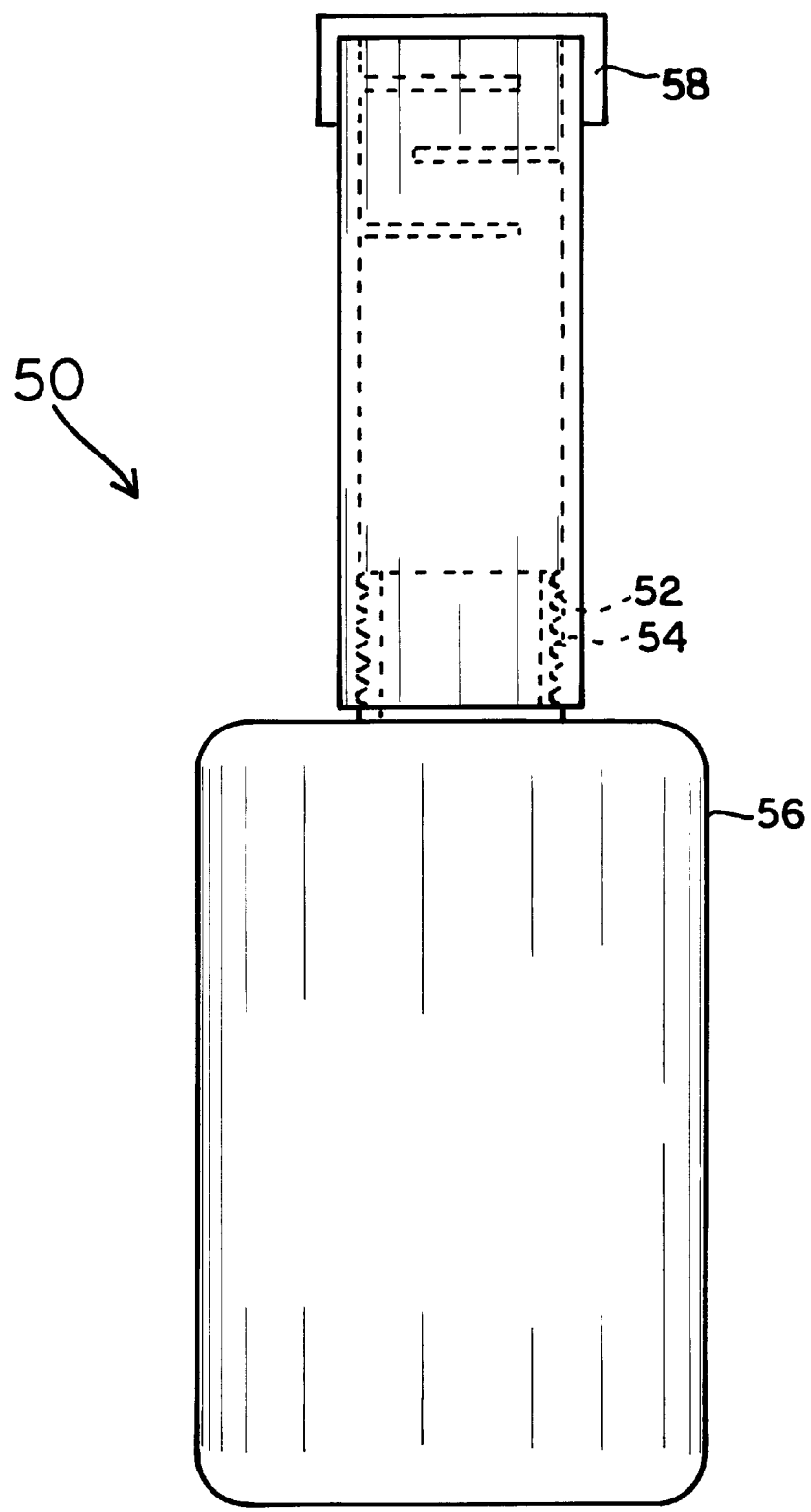
FIG. 6 is a side view of the measuring and dispensing device mounted on a threaded container.

A third preferred embodiment 50 is shown in FIG. 6. This embodiment is similar to the first embodiment, and can have the adjustable chamber of the second embodiment, but is configured with threads 52 to mount on the threaded neck 54 of a container 56. This measuring and dispensing device 50 thus is configured to mount on a storage container 56 for any free flowing material, such as salt, pepper, spices, chemical reagents, food additives, fertilizers, pesticides, herbicides, flaked, powdered or granule animal foods, or any material which is free flowing. In use, the measuring and dispensing device 50 would be mounted on a container 56, and would serve as the measuring and dispensing device for that product. It would typically come supplied with a cap 58, which would serve to seal the product from contact with air. Such containers with this attached measuring and dispensing device 50 would be used in kitchens, laboratories, homes, shops, and in every situation in which a free flowing material is to be measured and dispensed.

Figure 7:
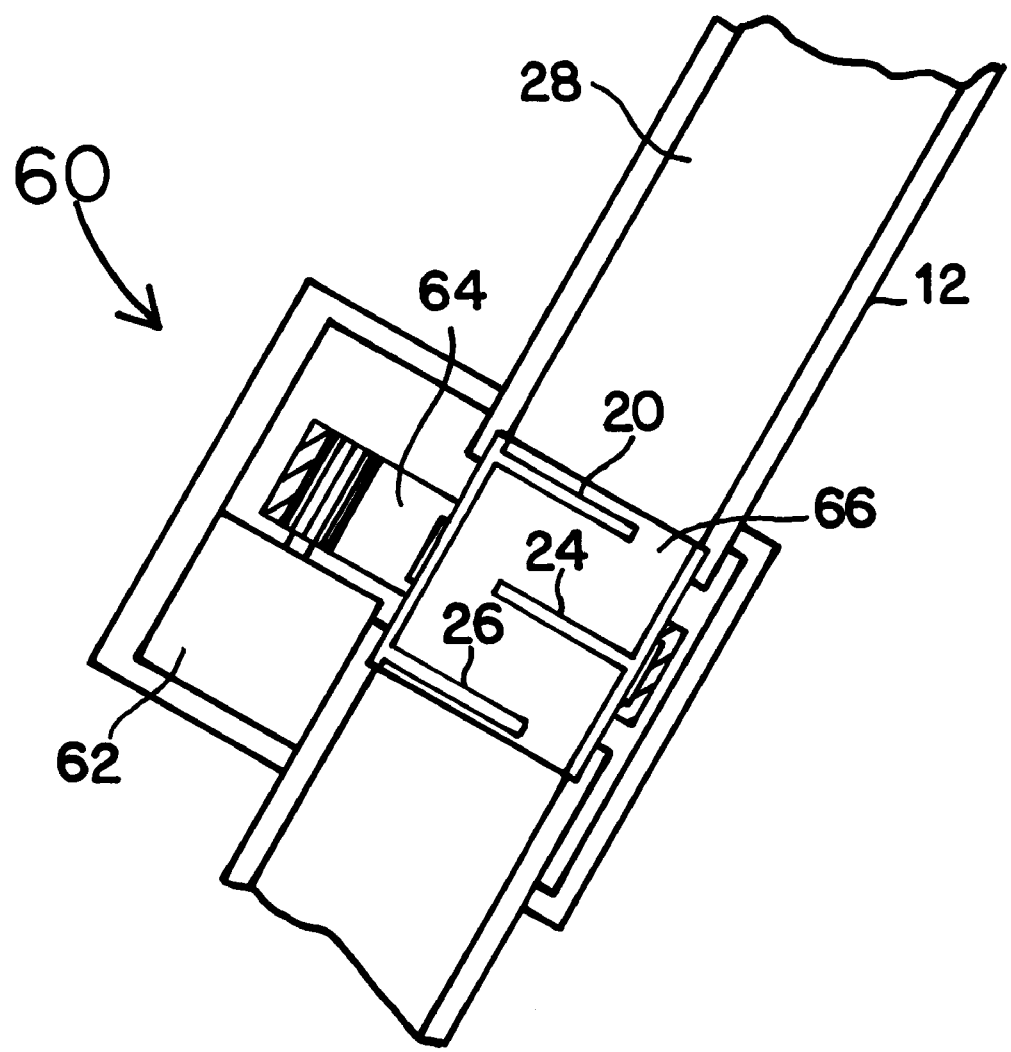
FIG. 7 is a side cross-sectional view of the measuring and dispensing device configured to be operated by an electric motor.
Figure 8:
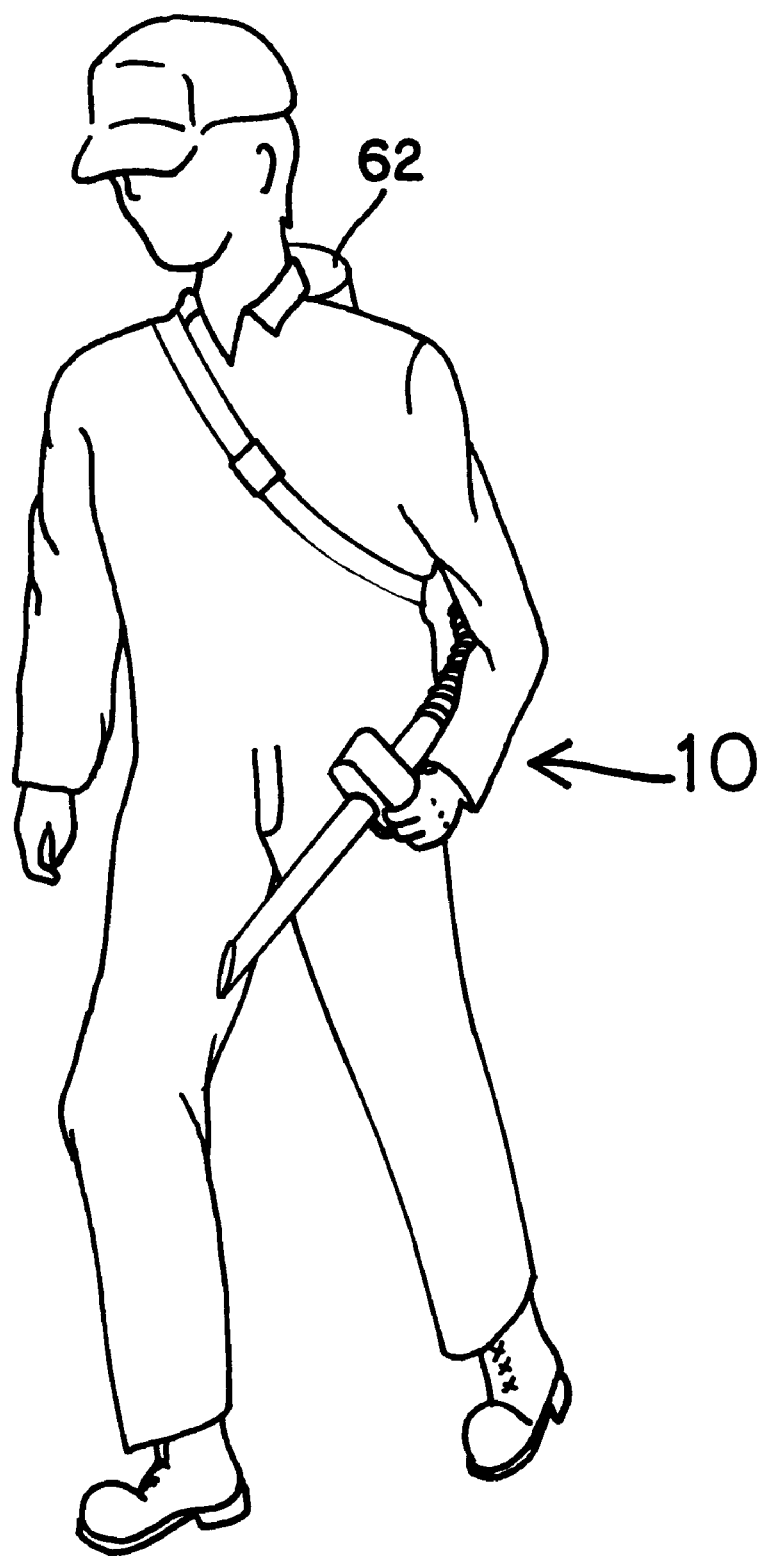
FIG. 8 is a perspective view of the measuring and dispensing device utilized in a motorized configuration.

Although each of these embodiments is shown to be operable by a manual rotation of the tubular channel 12, a fourth preferred embodiment 60 is shown in FIG. 7. This embodiment has similar characteristics of the first three, which include a first septum 20, a second septum 24, and a third septum 26, which control the measuring and dispensing of the free flowing material 14 from the storage chamber 28 of a tubular channel 12. Additionally, the measuring and dispensing device 60 also includes an electric motor 62, which utilizes a belt 64 to cause the rotation of a tubular measuring section 66 inside the tubular channel 12. The electric motor 62 is activated by a trigger (not shown) and can be configured to operate in an automatic or semi-automatic mode. In the semi-automatic mode, each pull of the trigger would result in one 360° rotation, and one discharge of measured free flowing material 14. In the automatic mode, holding down the trigger would result in a continual rotation of the measuring section 68, and continuing discharges of free-flowing material 14. The measuring and dispensing device 60 is shown in FIG. 8 being utilized with a shoulder mounted storage container 68. This embodiment of the invention could be utilized by a person dispensing fertilizer to plants in a commercial nursery, by an irrigator dispensing PAM to rows receiving irrigation water, by a worker adding food additives to animal feed in a feed lot, or any other situation in which free flowing materials are dispensed in measured quantities.

Although not shown, it is readily apparent that a mechanical triggering device, which when squeezed causes a mechanical rotation of the tubular channel 12 and the dispensing of free flowing material 14, would also be a desirable modification of the device, and falls within the scope of the invention. Other adaptations of the device are also desirable and possible, such as the use of this measuring device in a fixed position, such as for dispensing discreet volumes of powdered cocoa, soup mix, or powdered coffee mix in a vending machine.

Figure 9:
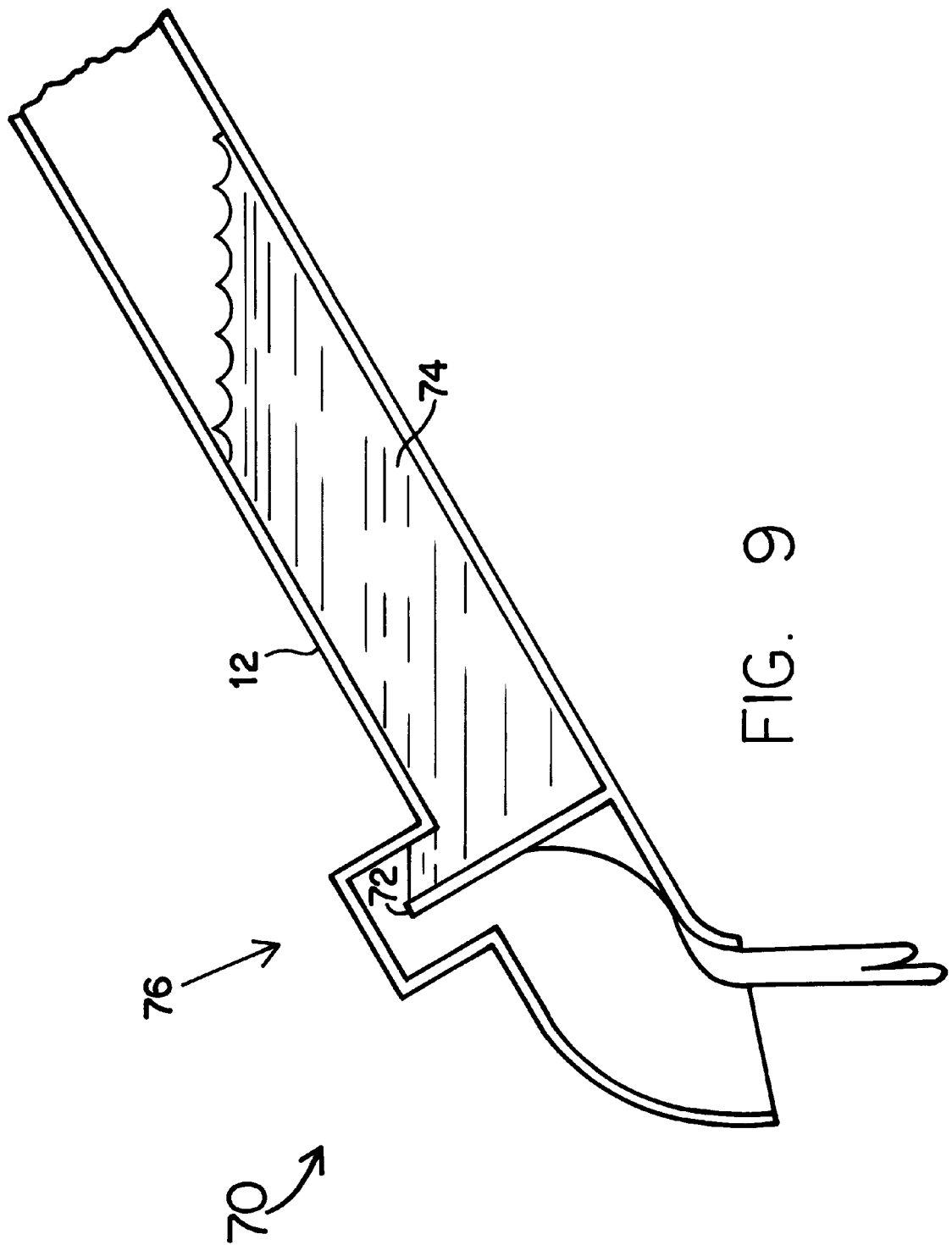
FIG. 9 is a side cross sectional view of a device using one septum and dispensing a liquid.

FIG. 9 shows a fifth preferred embodiment, which utilizes only one septum, and in which the holdup region 76 is offset from the longitudinal axis of the tubular channel. This device is shown with liquid 74 as the free flowing material. Using liquid 74, the tubular channel 12 can be elevated to a near vertical position, and only dispenses liquid 74 upon rotation of the tubular channel 12. For this to be used with a liquid, the portion above the dispensing nozzle must be made airtight.

While there is shown and described the present preferred embodiment of the invention, it is to be distinctly understood that this invention is not limited thereto but may be variously embodied to practice within the scope of the following claims.

I claim:

1. A device for measuring and dispensing quantities of free flowing material which travels from an upstream direction to a downstream direction in a flow through said device, comprising:
    a tubular channel with a longitudinal axis through which said free flowing material travels by gravity when said tubular channel is inclined at an angle;
    a holdup region in said tubular channel, where one or more septa is mounted for preventing the free flow of material from said tubular channel;
    one or more septa mounted in said holdup region of said tubular channel, normal to said flow of free flowing material, defining an opening against said tubular channel, which partially blocks said flow of free flowing material, but which allows a portion of material to flow past said openings in said septa when said tubular channel is rotated about said longitudinal axis of said tubular channel; wherein said free flowing material is measured and dispensed by rotation of said tubular channel.

2. The device for measuring and dispensing quantities of free flowing material of claim 1 which further comprises one septum mounted in a holdup region which is offset from said tubular channel.

3. The device for measuring and dispensing quantities of free flowing material of claim 1 which further comprises a means of adjusting for measuring and dispensing variable quantities of free flowing material to be delivered.

4. The device for measuring and dispensing quantities of free flowing material of claim 3 in which said means of adjusting for measuring and dispensing variable quantities of free flowing material to be delivered is a chamber of variable volume.

5. The device for measuring and dispensing quantities of free flowing material of claim 1 in which said tubular channel also comprises a storage chamber for said free flowing material.

6. The device for measuring and dispensing quantities of free flowing material of claim 1 which further comprises:
    a first septum mounted in said tubular channel normal to said flow of free flowing material, defining a first opening against said tubular channel, which partially blocks said flow of free flowing material, but which allows a portion of material to flow past said first opening in said first septum when said tubular channel with said first septum attached is rotated about said longitudinal axis of said tubular channel;
    a second septum mounted in said tubular channel normal to said flow of free flowing material, defining a second opening against said tubular channel, and mounted adjacent to and downstream from said first septum, which partially blocks said flow of free flowing material; but which allows a portion of material to flow past said second opening in said second septum when said tubular channel with said second septum attached is rotated about said longitudinal axis of said tubular channel; and
    a third septum, mounted in said tubular channel normal to said flow of free flowing material, defining a third opening against said tubular channel and mounted adjacent to and downstream from said first septum, and which partially blocks said flow of free flowing material but which allows a portion of material to flow past said third opening in said third septum when said tubular channel with said third septum attached is rotated about said longitudinal axis of said tubular channel; wherein said free flowing material is measured and dispensed by rotation of said tubular channel.

7. The device for measuring and dispensing quantities of free flowing material of claim 6 in which said first, second, and third openings defined by said first, second, and third septums are each positioned 180° from an adjacent opening.

8. The device for measuring and dispensing quantities of free flowing material of claim 1 in which material is dispensed by rotating said tubular channel 180° in one direction, and then 180° in an opposite direction.

9. The device for measuring and dispensing quantities of free flowing material of claim 1 in which material is dispensed by rotating said tubular channel 360° in one direction.

10. The device for measuring and dispensing quantities of free flowing material of claim 1 in which said tubular channel is rotated by means of an electric motor.

11. A device for measuring and dispensing quantities of free flowing material which travels from an upstream direction to a downstream direction in a flow through said device, comprising:
    a tubular channel with a longitudinal axis through which said free flowing material travels by gravity when said tubular channel is inclined at an angle, which mounts to a container of free flowing material and serves as its cap and dispenser;
    a first septum mounted in said tubular channel normal to said flow of free flowing material, defining a first opening against said tubular channel, which partially blocks said flow of free flowing material, but which allows a portion of material to flow past said first opening in said first septum when said tubular channel with said first septum attached is rotated about said longitudinal axis of said tubular channel;
    a second septum mounted in said tubular channel normal to said flow of free flowing material, defining a second opening against said tubular channel, and mounted adjacent to and downstream from said first septum, which partially blocks said flow of free flowing material; but which allows a portion of material to flow past said second opening in said second septum when said tubular channel with said second septum attached is rotated about said longitudinal axis of said tubular channel; and
    a third septum, mounted in said tubular channel normal to said flow of free flowing material, defining a third opening against said tubular channel and mounted adjacent to and downstream from said first septum, and which partially blocks said flow of free flowing material but which allows a portion of material to flow past said third opening in said third septum when said tubular channel with said third septum attached is rotated about said longitudinal axis of said tubular channel; wherein said free flowing material is measured and dispensed by rotation of said tubular channel.

12. A device for measuring and dispensing quantities of free flowing material which travels from an upstream direction to a downstream direction in a flow through said device, comprising:

a tubular channel with a longitudinal axis through which said free flowing material travels by gravity when said tubular channel is inclined at an angle above an angle of repose for said free flowing material and which has a means of adjusting for variable quantities of free flowing material to be delivered, said tubular channel also forming a storage chamber for said free flowing material;

a first septum mounted in said tubular channel normal to said flow of free flowing material, defining a first opening against said tubular channel and which partially blocks said flow of free flowing material, but which allows a portion of material to flow past said first opening in said first septum when said tubular channel with said first septum attached is rotated about said longitudinal axis of said tubular channel;

a second septum mounted in said tubular channel normal to said flow of free flowing material, defining a second opening against said tubular channel, and mounted adjacent to and downstream from said first septum, which partially blocks said flow of free flowing material; but which allows a portion of material to flow past said second opening in said second septum when said tubular channel with said second septum attached is rotated about said longitudinal axis of said tubular channel; and a third septum mounted in said tubular channel normal to said flow of free flowing material, defining a third opening against said tubular channel mounted adjacent to and downstream from said first septum, and which partially blocks said flow of free flowing material but which allows a portion of material to flow past said third opening in said third septum when said tubular channel with said third septum attached is rotated about said longitudinal axis of said tubular channel; wherein said free flowing material is measured and dispensed by rotation of said tubular channel.

\* \* \* \* \*